June 29, 1954  R. H. JORDAN  2,682,628
REMOTE-CONTROL IMPULSING ROTATOR
Filed Oct. 17, 1950  4 Sheets-Sheet 1

*INVENTOR.*
RICHARD H. JORDAN
BY
Woodling and Krost,
attys.

June 29, 1954   R. H. JORDAN   2,682,628
REMOTE-CONTROL IMPULSING ROTATOR
Filed Oct. 17, 1950   4 Sheets-Sheet 2

INVENTOR.
RICHARD H. JORDAN
BY
Woodling and Krost,
attys.

June 29, 1954     R. H. JORDAN     2,682,628
REMOTE-CONTROL IMPULSING ROTATOR
Filed Oct. 17, 1950     4 Sheets-Sheet 3

INVENTOR.
RICHARD H. JORDAN

Patented June 29, 1954

2,682,628

UNITED STATES PATENT OFFICE 2,682,628

REMOTE-CONTROL IMPULSING ROTATOR

Richard H. Jordan, Mansfield, Ohio, assignor to The Alliance Manufacturing Company, a corporation of Ohio Application October 17, 1950, Serial No. 190,506

5 Claims. (Cl. 318—31)

1

The invention relates in general to rotating devices and more particularly to rotating devices which have an indicator to indicate the desired position of a rotatable member.

An object of the invention is to provide an antenna rotator wherein a first revoluble member has a first indicator for indicating at least the desired rotational direction of an antenna shaft and a second revoluble member has a second indicator for indicating the actual position of the antenna shaft.

Another object of the invention is to provide an antenna rotator wherein first and second relatively movable members may be aligned or misaligned. First and second index points are relatively movable to indicate the desired position of the antenna and the second and a third index points are relatively movable in accordance with relative movement of said members to indicate the actual position of the antenna. Misalignment of the first and third index points sets in motion a stepping impulse means to effect realignment of these points.

Another object of the invention is to provide an antenna rotator wherein a first revoluble member has a first indicator for indicating the desired position of an antenna shaft and a second revoluble member has a second indicator for continuously indicating the position of the antenna shaft.

Another object of the invention is to provide an antenna rotator wherein a first revoluble member has a first indicator cooperating with indicia and wherein a revoluble escapement wheel member has a second indicator also cooperating with the indicia and which member is a part of a step-by-step impulse means which is set in motion to effect selected unidirectional rotation of the second wheel member.

Another object of the invention is to provide a selector and indicator mechanism for an antenna rotator wherein two relatively revoluble members are provided with step-by-step impulse means actuated upon misalignment of index points on these members to effect realignment of these index points. The step-by-step impulse means may include an anchor verge which rockingly cooperates with an escapement wheel to effect such realignment.

Another object of the invention is to provide a selector and indicator mechanism for an antenna rotator wherein two relatively movable members have index points which, upon misalignment, provide an electrical connection to energize electromagnetic means effecting a timed rocking of

2 the verge to permit escapement of one of the members and thus establish realignment of these index points.

Other objects and a fuller understanding of the invention may be had by referring to the following description and claims, taken in conjunction with the accompanying drawings, in which:

Figure 2:
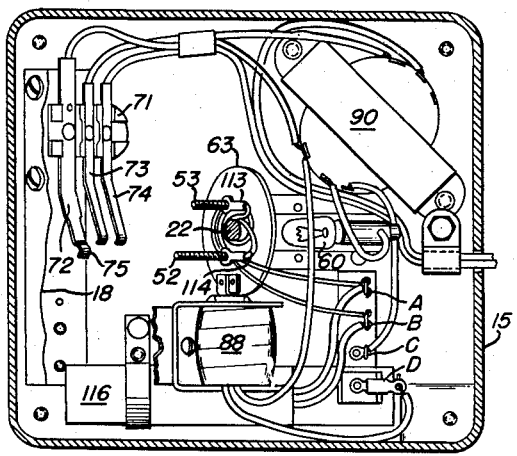
Figure 2 is a sectional view taken along the line 2—2 of Figure 1 with the ratchet and escapement wheel subassembly removed.

The Figures 1–11 give the details of construction of the control case which houses the selecting and indicating mechanism of the antenna rotator. A housing 15 is provided with a bottom cover 16 fastened by screws 17. A front panel 18 is attached to the bottom cover 16 and carries a bearing 19 near the middle. A bearing bracket 20 is also attached to the bottom cover 16 and has a second bearing 21. A shaft 22 is journaled in the bearings 19 and 21 and a selector knob 23 is fixedly attached to the forward end of the shaft 22 by the set screw 24.

Figure 4:
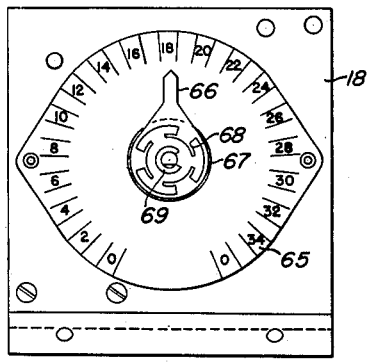
Figure 4 is a view of the front panel of the control case removed from the housing and with the knob removed.
Figure 6:
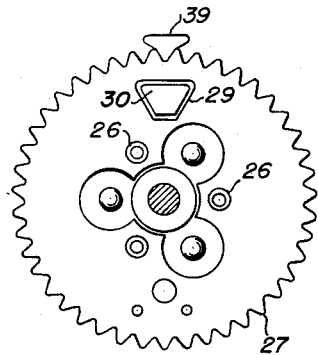
Figure 6 is a partial view of a first ratchet wheel member taken along the line 6—6 of Figure 5.
Figure 7:
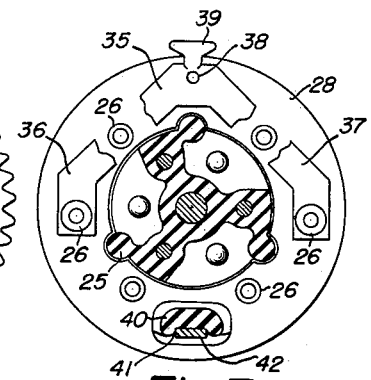
Figure 7 is a partial view of the front contact plate, and taken along the line 7—7 of Figure 5.
Figure 8:
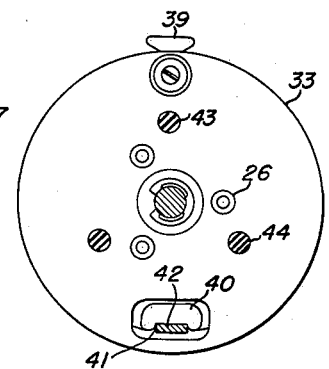
Figure 8 is a partial view of the rear contact plate, and taken along the line 8—8 of Figure 5.
Figure 5:
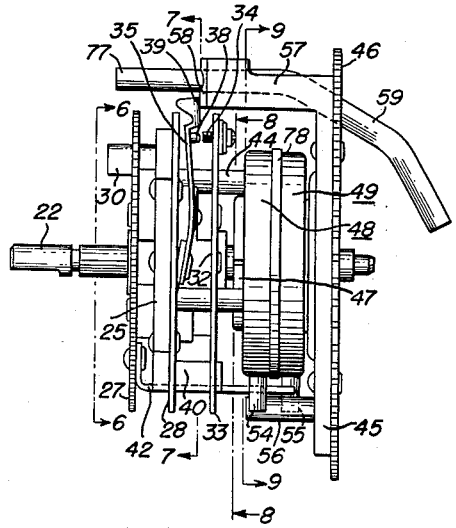
Figure 5 is a side view of the ratchet and escapement wheel assembly removed from the housing and drawn to an enlarged scale.
Figure 10:
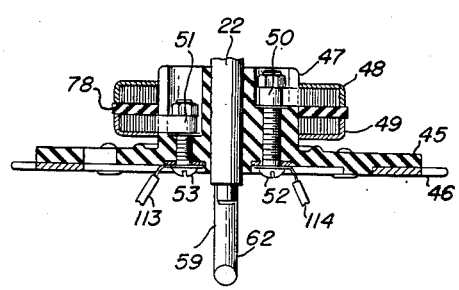
Figure 10 is a sectional view of the escapement wheel assembly taken along the line 10—10 of Figure 9.

Fixedly attached to the shaft 22 is a ratchet support 25 made of some insulating material, better seen in Figure 5. Fixedly attached to the ratchet support 25 as by the rivets 26 is the ratchet wheel 27. Also fixedly attached to the ratchet support 25 by rivets 26 is a front contact plate 28. An aperture 29 in the ratchet wheel 27 loosely receives an alignment abutment 30 of the ratchet support 25, which abutment extends toward the front of the housing 15. A lug 31 is stamped and bent from the front panel 18 to cooperate with the abutment 30, and hence limit the rotation of the ratchet wheel 27 to approximately 315 degrees. This 315-degree rotation may be seen in the Figure 4. Fixedly riveted to the rear face 32 of the ratchet support 25 is a rear contact plate 33. The rear contact plate 33 carries an adjustable contact 34. A contact spring 35 has the first and second legs 36 and 37 thereof riveted to the front contact plate 28 by rivets 26. Since the ratchet support 25 is an insulator, the front and rear contact plates 28 and 33 are electrically insulated. The contact spring 35 carries a contact 38 for cooperation with the adjustable contact 34. The contact spring 35 also carries a cam surface 39 at the upper end thereof. The ratchet support 25 has a rearwardly extending lug 40 with a groove 41 therein. A metallic L bracket 42 is fixedly attached to the ratchet wheel 27 and extends rearwardly past the rear contact plate 33 and lies in the groove 41 of the lug 40. As seen in the Figures 7 and 8 the L bracket 42 touches neither the front nor the rear contact plates 28 and 33 because of apertures therein. The rear contact plate 33 has apertures 43 and the ratchet support 25 has spacer lugs 44 extending through these apertures 43.

Figure 1:
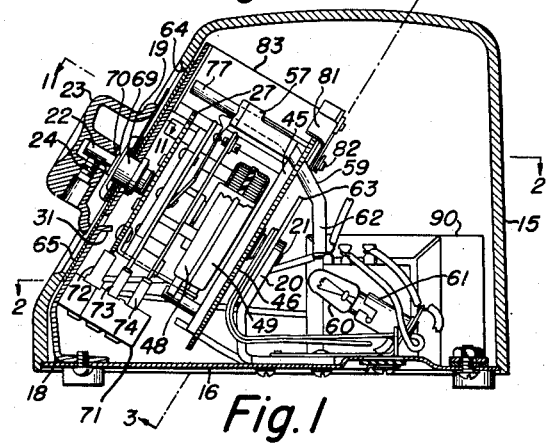
Figure 1 is a sectional elevational view of a control case which includes the remote control and indicating mechanism.
Figure 9:
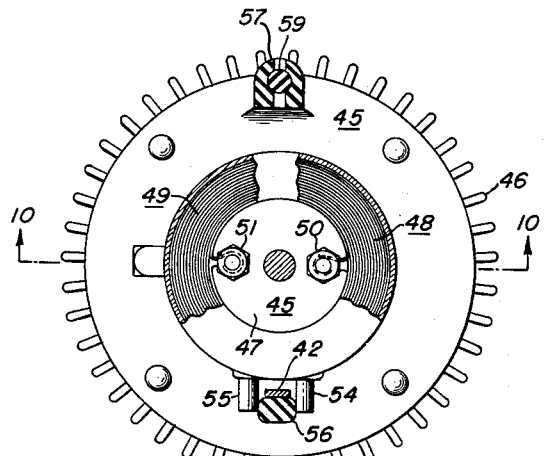
Figure 9 is a partial view of the escapement wheel and the spring assembly thereof, taken along the line 9—9 of Figure 5.

An escapement plate 45 made of an insulating material is loosely journaled on the rear portion of the shaft 22. Fixedly attached to this escapement plate 45, as by the rivets 26, is an escapement wheel 46. The escapement plate 45 has a hub portion 47 which carries first and second spring motors 48 and 49. An insulating disc 78 separates the first and second spring motors 48 and 49. The spring motors are in the form of flat coil springs having inner ends 50 and 51, respectively, which are attached to the escapement plate 45 by the electrically conducting bolts 52 and 53, respectively. The coil springs of the spring motors 48 and 49 are wound in opposite directions. Outer ends 54 and 55 of the spring motors 48 and 49, respectively, are preloaded and bear against a forwardly extending insulator lug 56 on the escapement plate 45. The L bracket 42, as seen in Figures 1, 5 and 9, extends between the outer ends 54 and 55; however, it has a narrower width than the lug 56, and hence this L bracket 42 may physically and electrically contact only one at a time of the outer ends 54 and 55. The escapement plate 45 carries a forward bracket 57 of insulating material having a cam surface 58 for cooperating with the cam surface 39 of the contact spring 35. As shown in the Figures 1 and 5, these two cam surfaces abut to separate the contacts 34 and 38. Each of the cam surfaces 39 and 58 are somewhat rounded to facilitate their engagement during relative rotation. A light pipe 59 is carried by the forward bracket 57 and extends through an aperture in the escapement wheel 46. An indicator lamp 60, Figure 1, is carried in a lamp socket 61 which is fastened to the bottom cover 16. The rearward end 62 of the light pipe 59 extends toward the indicator lamp 60 and is axially aligned with the filament of this lamp. A shield 63 is carried by the shaft 22 in order to shield the front of the housing 15 from the light of the indicator lamp 60, and to prevent tangling of the electrical wiring around the bearing bracket 20.

Figure 11:
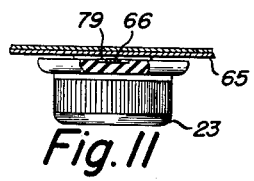
Figure 11 is an enlarged sectional view of the lost motion connection in the operating knob and pointer taken along the line 11—11 of Figure 1.

The front panel 18 covers the underside of an aperture 64 in the front of the housing 15. A translucent scale 65 is mounted on the front panel 18. This translucent scale 65 is marked off in a total of 36 positions over an arc of about 315 degrees. This is shown in Figure 4, wherein the knob 23 has been removed to better show the construction details. A pointer 66 is journaled on the bearing 19. A pointer washer 67 is disposed between the pointer 66 and the scale 65. A spring washer 68 is disposed between the pointer 66 and a retaining ring 69 which engages a groove 70 in the shaft 22. Since the spring washer presses the pointer 66 against the pointer washer 67, which in turning is frictionally engaging the scale 65, the pointer 66 does not readily turn. The knob 23 has a groove 79 therein to receive the pointer 66, as shown in Figure 11. The width of the groove 79 is greater than the width of the pointer 66 to give a lost motion connection relative to the knob 23 of about 8 to 10 degrees.

An insulating bracket 71 is carried by the front panel 18 and this bracket carries a ratchet contact spring 72, a front contact plate spring 73 and a rear contact plate spring 74. The ratchet contact spring 72 has a hump 75 to engage the teeth of the ratchet wheel 27. The front panel 18 also has a series of 36 holes 76 (Figure 3) disposed opposite the path of the forward end 77 of the light pipe 59. The front and rear contact plate springs 73 and 74 are adapted to electrically contact the circular periphery of the front and rear contact plates 28 and 33, respectively.

Figure 3:
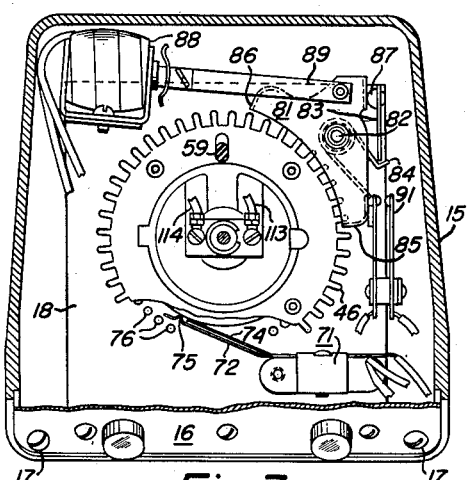
Figure 3 is a sectional view taken along the line 3—3 of Figure 1.

An anchor verge 81 is pivoted at 82 about a verge support 83 carried by the front panel 18. A verge spring 84 urges the verge in a clockwise direction, as seen in Figure 3, so that a first pallet 85 engages the teeth of the escapement wheel 46. A second pallet 86 is carried by the verge 81 to alternatively engage the teeth of the escapement wheel 46. A bumper 87 limits the clockwise movement of the verge 81. A solenoid 88 is supported from the front panel 18 and has an arm 89 pivotally linked to the verge 81 so that upon energization of the solenoid 88 the arm 89 is retracted to rock the verge 81 against the urging of the spring 84. A transformer 90 is mounted on the upper side of the bottom cover 16. A synchronizing switch 91 is positioned to be actuated to a closed position by the rocking of the verge 81.

Figure 12:
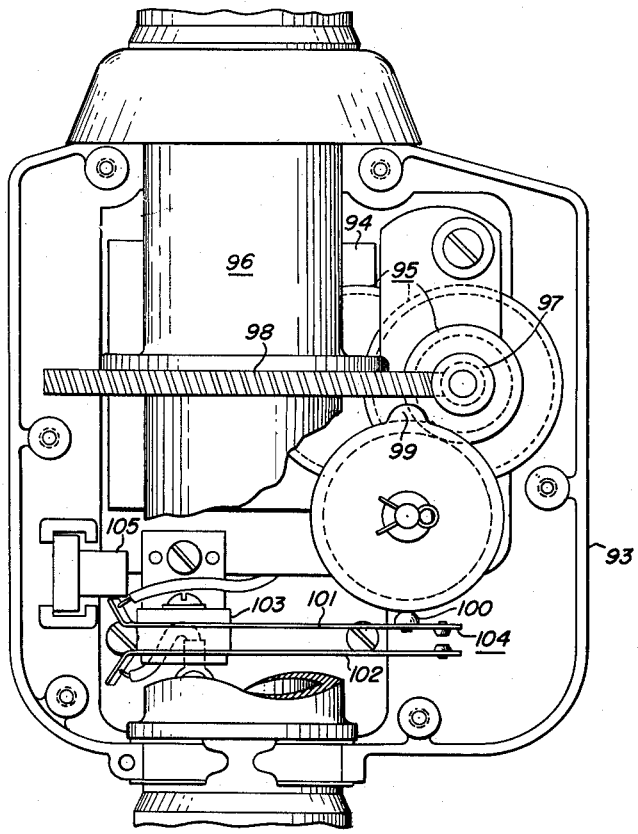
Figure 12 is a sectional view of the antenna rotator mechanism.

The Figure 12 shows the actual antenna rotator assembly 93, which is fixedly attached to any suitable support. The rotator 93 carries an electric motor 94, which, through a gear train 95, drives a revoluble hollow shaft 96. The gear train includes a worm 97 and a worm wheel 98. The hollow shaft 96 is adapted to receive an antenna shaft, not shown, for rotation thereof relative to the rotator 93. A cam 99 is driven from the gear train 95 and cooperates with a cam follower 100. The cam follower 100 is carried by a first contact spring 101, and this contact spring as well as a second contact spring 102 are carried by the insulating block 103 to form an impulse switch 104. The cam 99 has a gear ratio relative to the hollow shaft 96 of approximately 36:1, such that the switch 104 opens and closes 36 times for one revolution of this hollow shaft 96. An overrunning mechanical stop 105 is provided to limit rotation of the hollow shaft 96 to about 360 degrees. The cam 99 is adjusted so that the switch 104 is open at both rotational limits.

Figure 13:
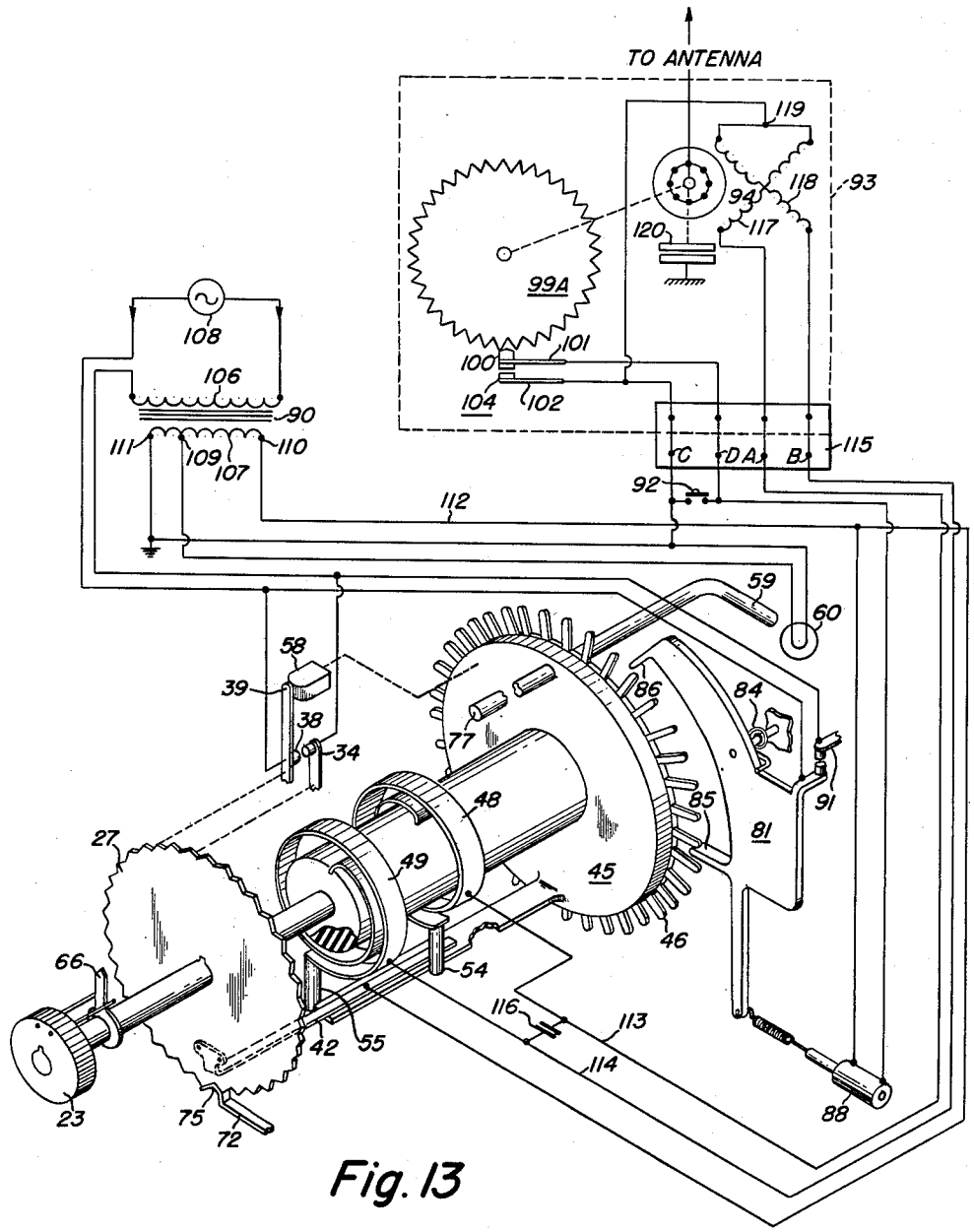
Figure 13 is a schematic diagram of the entire system.

The Figure 13 shows a combined simplified isometric view and schematic wiring diagram for the rotator and indicator, and the transformer 90 is shown as having a primary 106 and a secondary 107. The primary 106 is adapted to be energized from an alternating current source 108 through the contacts 38 and 34. The secondary 107 has a low voltage terminal 109 and first and second end terminals 110 and 111. The second end terminal 111 is grounded, and the indicator lamp 60 is connected between the terminals 109 and 111. The first end terminal 110 is connected by a lead 112 to the metallic L bracket 42. This L bracket 42 is adapted to make physical and electrical contact with one, but not both, of the outer ends 54 and 55 of the spring motors 48 and 49. The spring motors 48 and 49 are insulated from each other, and the coil springs therein carry electrical current to flexible leads 113 and 114 which connect to terminals A and B on a terminal strip 115. A condenser 116 for the motor 94 is connected across the terminals A and B. The terminal strip 115 also has terminals C and D with the terminal C being grounded and the terminal D being connected through the solenoid 88 to the first end terminal 110 of the secondary 107. The circuit diagram of Figure 13 also shows the wiring connections for the rotator assembly 93 wherein the terminals A and B are connected to first and second running windings 117 and 118 of the capacitor induction motor 94. The terminal C is connected to the common juncture 119 of the other ends of these running windings. The contact springs 101 and 102 are connected in series between the terminals C and D, and are shown as being actuable by a simplified cam 99A.

The motor 94 has been provided with a friction brake 120 which connects the rotor of this motor 94 to a stationary support. This friction brake 120 (diagrammatically shown in Figure 13) is preferably of the spring-actuated type which is released by axial motion of the motor rotor resulting from magnetic forces trying to bring the rotor into magnetic alignment with the stator. This friction brake prevents coasting of the motor 94 and prevents any possibility that there would be an extra actuation by the cam 99 of the switch 104.

The synchronizing switch 91 is shown diagrammatically in Figure 13 and is also shown in Figure 3. This synchronizing switch is connected in parallel with the primary switch contacts 34 and 38. A manual switch 92 (shown diagrammatically in Figure 13) is also provided across the terminals C and D of the terminal strip 115.

In operation the pointer 66 indicates the desired position of the antenna carried by the hollow shaft 96, and the forward end 77 of the light pipe 59 indicates the actual position of this antenna. As seen in Figures 1 and 5, the cam surface 58 is engaging the cam surface 39 to open the contacts 34 and 38. These contacts are in the primary circuit of the transformer 90, and hence this transformer is de-energized. This occurs when the pointer 66 is aligned with the light pipe 59. If now the pointer 66 is turned to another position by means of the knob 23, the cam surface 39 will drop off the cam surface 58 thus closing the contacts 38 and 34 and energizing the transformer 90. The secondary 107 is thus energized to light the indicator lamp 60. Light is transmitted through the light pipe 59 and through one of the series of holes 76 to shine through the translucent scale 65 and will momentarily indicate, by this spot of light, the former position of the pointer 66 and indicate the present position of the antenna shaft 96. Since the transformer secondary 107 is energized, a potential will be available at the metallic L bracket 42 by means of the lead 112, the ratchet contact spring 72 and the ratchet wheel 27. This L bracket 42 will be in electrical and physical contact with only one of the outer ends 54 and 55 of the spring motors. As best seen in Figure 9, movement of the L bracket 42 in a counterclockwise direction, for example, will cause it to bear against the outer end 54 to wind the coil spring in the spring motor 48. Since both spring motors are freely journaled relative to the shaft 22, and have the inner ends thereof fast to escapement plate 45, this winding of the spring motor 48 will tend to rotate the escapement plate 45 in a counterclockwise direction but rotation thereof is prevented by the pallet 85 engaging a tooth of the escapement wheel 46. Thus, as is seen in the rear view of Figure 3, the escapement wheel 46 will attempt to rotate in a clockwise direction. Since the L bracket 42 is electrically contacting the outer end 54 of the spring motor 48, and the inner end 50 thereof is connected by the flexible lead 113 to the terminal A on the terminal strip 115, the motor 94 and also the hollow shaft 96 will rotate in a proper direction corresponding to the counterclockwise rotation of the knob 23. The motor 94 runs, since the running winding 117 obtains an alternating current voltage and the running winding 118 obtains a phase displaced alternating current voltage through the condenser 116.

As the motor 94 rotates the gear train 95, the cam 99 actuates the contact spring 101 to open and close the circuit to the solenoid 88. As the solenoid 88 is energized intermittently it rocks the verge 81 against the urging of the spring 84 to thus release the escapement wheel 46 a tooth at a time. This action may be considered as a step-by-step impulse means which permits realignment of the light pipe 59 with the pointer 66. The making and breaking of the switch 104 and the timed rocking of the verge 81 continues until this realignment of the light pipe 59 and pointer 66 is established, whereupon the cam surface 58 opens the contacts 38 and 34 to de-energize the transformer 90. As the light pipe 59 moves, a circle or spot of light will be seen on the translucent scale 65 through the holes 76, and this spot of light moves step-by-step to become realigned with the pointer 66, whereupon the light goes out.

Since the escapement wheel 46 was going in a clockwise direction, as seen in Figure 3, the inside edge of the pallet 85 will be against the tooth positioned counterclockwise of this pallet. If now the knob 23 is turned only one notch in the opposite direction, as determined by the ratchet hump 75 cooperating with the ratchet wheel 27, then the electrical circuit to the transformer 90 will not be closed. This is because of the space between the teeth of the escapement wheel. Turning the knob 23 in the opposite direction turns the shaft 22 and the ratchet support 25. The ratchet wheel 27 and the front and rear contact plates 28 and 33 also turn through this same arc. This arcuate movement will be about 9 degrees. The L bracket 42 will turn the spring motors 48 and 49 and the escapement wheel 46 about 6 degrees, or the arcuate distance between the teeth on the escapement wheel 46. The hump 75 of the ratchet contact spring 72 will thus essentially lock into a trough between the teeth on the ratchet wheel 27, and this relative movement of about 3 degrees between the front contact plate 28 and the escapement wheel 46 will be insufficient to permit contact between the contacts 38 and 34. It will thus be seen that movement of the knob 23 only one notch in a direction opposite to the previous movement will merely take up the lost motion between the teeth of the escapement wheel 46 and will not result in any rotation of the hollow shaft 96. Since there is lost motion between the teeth of the escapement wheel 46, the pointer 66 has likewise been provided with a lost motion relative to the knob 23 so as not to give an erroneous indication of the position of the antenna. The lost motion between the pointer 66 and the knob 23 has been made about 9 degrees, and hence turning of the knob 23 by one notch oppositely to its former direction of rotation will not move the pointer 66. If the knob 23 is turned one notch further, then the pallet 85 of the verge 81 prevents rotation of the escapement wheel 46, and hence the primary 106 of the transformer 90 is energized through the contacts 38 and 34. This will energize the motor 94 to drive the cam 99 and energize the solenoid 88 to rock the verge 81 and permit escapement of the escapement wheel 46. This escapement of only one tooth on the escapement wheel 46 will again bring the light pipe 59 and the pointer 66 into alignment and the transformer 90 will become de-energized.

The escapement wheel 46 could be made with V-shaped teeth, like the ratchet wheel 27, thus eliminating the lost motion of the pallet 85 relative to the teeth of this wheel 46. This would also eliminate the need for the lost motion connection between the pointer 66 and the knob 23. However, the V-shaped teeth on such an escapement wheel would require a considerably stronger verge spring in order to hold the escapement wheel against rotation. This is because the V-shaped teeth would have a camming action which would attempt to cam the pallet of the verge out of engagement with the teeth. A stronger verge spring would need a correspondingly stronger solenoid 88 in order to pull against the verge spring.

It will be noted that the cam 99 actuates the switch 104 thirty-six times for one complete revolution of the antenna shaft, and that the escapement wheel 46 and the ratchet wheel 27 each have 40 teeth. This is to permit 360 degrees rotation of the hollow shaft 96 with a rotation of the pointer 66 of only about 315 degrees. The 315-degree rotation provides 36 active teeth on both the wheels 27 and 46. This is purely for ease of manufacture and it will be obvious that any other ration of relative rotation may be effected by appropriate design.

The synchronizing switch 91 is provided as a precaution to maintain synchronism between the antenna shaft 96 and the light pipe 59. When the cam 99 is rotating, the switch 104 is alternately opened and closed. When this switch 104 is closed the solenoid 88 is energized to rock the verge 81. If at this instant the selector knob 23 were rotated in the opposite direction a sufficient distance the primary switch 34—38 would open and close. This would give an added impulse to the solenoid 88 if the synchronizing switch 91 were not provided. This extra impulse could cause an extra rocking of the verge which would permit an extra tooth to escape on the escapement wheel 46. Thus, the escapement wheel 46 and light pipe 59 would be ahead of the actual position of the antenna shaft 96. The synchronizing switch 91 makes certain that the transformer 90 will always remain energized as long as the switch 104 is closed, thus eliminating these additional impulses.

The manual switch 92 is provided as a means for manually reestablishing the synchronism of the antenna shaft 96 and light pipe 59 if they should ever get out of synchronism. This might occur if the electrical power from the alternating current source 108 should momentarily be interrupted during the time that the switch 104 is closed. It can be determined that the unit is out of synchronism by rotating the selector knob 23 alternately to both of the rotational limits. Since the motor 94 has a physical stop 105 permitting approximately 360 degrees rotation, the alignment of the escapement wheel 46 with the antenna shaft 96 can be determined. If at either of the two rotational limits the antenna shaft 96 should reach its physical stop before the escapement wheel 46 has rotated sufficiently to open the primary switch 34—38, then the spot of light coming from the light pipe 59 will not be extinguished but will remain at one of the scale divisions removed from the end position on the scale 65. This is an indication that the unit is out of synchronism. The manual switch 92 may then be actuated intermittently to intermittently energize the solenoid 88 and hence again bring the escapement wheel 46 into alignment with the antenna shaft 96.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a reversible electrical drive means for rotating an antenna shaft relative to a fixed support, the provision of energization means for said electrical drive means, a first ratchet wheel having a first indicator moved in accordance with the movement of said ratchet wheel to indicate the desired position of said antenna shaft, a detent retarding the movement of said first ratchet wheel, indicia, a second escapement wheel having a second indicator moved in accordance with the movement of said second escapement wheel and cooperating with said indicia to indicate the position of said antenna shaft, first and second springs acting between said wheels and urging same into alignment of said indicators, switch means having as double throw contacts said first and second springs and actuated in accordance with the relative rotation of said wheels, connection means for connecting said switch means to said energization means and to said reversible electrical drive means for selecting the rotational direction of said antenna shaft, a second switch intermittently actuated by said electrical drive means, and electro-magnetic means connected to be energized from said energization means through said second switch for effecting a partial rotation of said second escapement wheel upon energization of said electromagnetic means.

2. In a reversible electrical drive means for rotating an antenna shaft relative to a fixed support, the provision of energization means for said electrical drive means, indicia, a first ratchet wheel having a first indicator moved in accordance with the movement of said ratchet wheel and cooperating with said indicia to indicate the desired position of said antenna shaft, a detent retarding the movement of said first ratchet wheel, a second escapement wheel having a second indicator moved in accordance with the movement of said second wheel and cooperating with said indicia to indicate the position of said antenna shaft, first and second springs acting between said wheels and urging same into alignment of said indicators, double throw switch means acting through said springs and actuated in accordance with the relative rotation of said wheels, connection means for connecting said switch means to said energization means and to said reversible electrical drive means for selecting the rotational direction of said antenna shaft, and step-by-step impulse means actuated upon rotation of said drive means for effecting relative rotation of said first and second wheels to re-establish coincidence of said indicators.

3. In an electrically controllable drive means for rotating an antenna shaft relative to a fixed support, the provision of energization means for said electrical drive means, a first revoluble indicator to indicate the desired position of said antenna shaft, an escapement wheel member having radial teeth, a second indicator moved in accordance with the movement of said escapement wheel member to indicate the actual position of said antenna shaft, means urging said indicators into alignment, single pole switch means actuated in accordance with the relative movement of said indicators, said switch means being in an open position when the position of said first and second indicators coincide and being in a closed position when said first and second indicators are misaligned, connection means for connecting said switch means to said energization means and to said drive means for effecting the rotation of said antenna shaft, an anchor verge cooperating with the radial teeth of said escapement wheel member to lock same in position until rocking of said verge, a spring urging said verge into engagement with said escapement wheel member, a single solenoid connected to said verge to release said escapement wheel member by one tooth upon energization of said solenoid, second switch means connecting said solenoid to said energization means, and means for actuating said second switch by movement of said drive means.

4. In an electrically controllable drive means for rotating an antenna shaft relative to a fixed support, the provision of energization means for said electrical drive means, a scale, a first ratchet wheel member, a first indicator moved in accordance with the movement of said first ratchet wheel member and cooperating with said scale to indicate the desired position of said antenna shaft, a detent retarding the movement of said first ratchet wheel member, a second escapement wheel member, a second indicator moved in accordance with the movement of said second escapement wheel member and cooperating with said scale to indicate the actual position of said antenna shaft, first and second springs acting between said wheel members and urging same into alignment of said indicators, single pole switch means acting through said springs and actuated in accordance with the relative movement of said wheel members, said switch means being in an open position when the position of said first and second indicators coincide and being in a closed position when said first and second indicators are misaligned, connection means for connecting said switch means to said energization means and to said electrically controllable drive means for effecting the rotation of said antenna shaft, an anchor verge cooperating with said second escapement wheel member to control the movement thereof, a spring urging said verge into engagement with said second escapement wheel member, a solenoid connected to said verge to release said second escapement wheel member by one tooth upon energization of said solenoid, second switch means connecting said solenoid to said energization means, and means for actuating said second switch means by movement of one of said verge means and said drive means.

5. In a reversible electrical drive means for rotating an antenna shaft relative to a fixed support, the provision of energization means for said electrical drive means, a scale, a ratchet wheel member having a first index point, a first indicator moved in accordance with the movement of said ratchet wheel member and cooperating with said scale to indicate the desired position of said antenna shaft, a detent retarding the movement of said ratchet wheel member, an escapement wheel member with radial teeth and having a second index point, a second indicator moved in accordance with the movement of said escapement wheel member and cooperating with said scale to indicate the actual position of said antenna shaft, spring means acting between said wheel members and urging same into alignment of said index points, single pole double throw switch means actuated in accordance with the relative movement of said wheel members, said switch means being in a neutral position when the position of said first and second index points coincide and being in one or the other of said two contact positions when said first and second index points are misaligned, connection means for connecting the two contacts of said switch means to said energization means and to said reversible electrical drive means for selecting the rotational direction of said antenna shaft, an anchor verge cooperating with said escapement wheel member to positively lock same against rotation in either direction until said verge is rocked, a spring urging said verge into engagement with said escapement wheel member, a single solenoid connected to said verge to rock same to release said escapement wheel member by one tooth upon energization of said solenoid, second switch means connecting said solenoid to said energization means, and means for actuating said second switch means by movement of said drive means.

References Cited in the file of this patent

UNITED STATES PATENTS

| Number | Name | Date |
|--------|------|------|
| 835,381 | Willard | Nov. 6, 1906 |
| 835,382 | Willard | Nov. 6, 1906 |
| 1,018,765 | Janette | Feb. 27, 1912 |
| 2,458,983 | Dunn | Jan. 11, 1949 |
| 2,575,357 | Nichols | Nov. 20, 1951 |